United States Patent [19]
Mortensen

[11] Patent Number: 5,774,998
[45] Date of Patent: Jul. 7, 1998

[54] PIPE SADDLE GAUGE

[76] Inventor: Jason Gregory Mortensen, P.O. Box 1794, Brooks, Alberta, Canada, T1R 1C5

[21] Appl. No.: 661,093

[22] Filed: Jun. 10, 1996

[51] Int. Cl.⁶ ...................................................... B26D 7/01
[52] U.S. Cl. ........................ 33/529; 33/640; 83/468.3; 83/468.7
[58] Field of Search ........................ 33/529, 630, 640, 33/465, 472, 473, 533, 538, 626, 641; 83/468.3, 468.7, 522.26, 467.1, 468.4, 468.6, 468, 468.1

[56] References Cited

U.S. PATENT DOCUMENTS

| | | |
|---|---|---|
| 1,345,597 | 7/1920 | Jantsch . |
| 2,431,100 | 11/1947 | Woods ................................. 33/174 |
| 2,752,960 | 7/1956 | Poeltl ............................... 83/435.12 |
| 2,827,708 | 3/1958 | De Peu ................................. 33/529 |
| 3,083,744 | 4/1963 | Vold ................................. 83/468.3 |
| 3,209,459 | 10/1965 | Fish ..................................... 33/174 |
| 3,270,426 | 9/1966 | Fischer et al. ...................... 33/529 |
| 3,392,761 | 7/1968 | Klein ............................... 83/468.6 |
| 3,911,586 | 10/1975 | Malonda ............................. 33/174 |
| 4,680,869 | 7/1987 | Murkens ............................. 33/533 |
| 4,700,489 | 10/1987 | Vasile ................................. 33/342 |
| 5,058,284 | 10/1991 | Stevenson ........................... 33/535 |
| 5,231,766 | 8/1993 | Pavlak ................................. 33/529 |
| 5,343,627 | 9/1994 | Hesseltine ........................... 33/535 |

FOREIGN PATENT DOCUMENTS 190108 12/1921 United Kingdom .
792869 3/1955 United Kingdom .

OTHER PUBLICATIONS

Science & Mechanics Jun. 1945.

Advertisement AA Gage Company No Date.

*Primary Examiner*—Thomas B. Will
*Attorney, Agent, or Firm*—David S. Thompson

[57] ABSTRACT

A pipe saddle gauge is disclosed. The pipe saddle gauge provides a frame which adjusts in a telescoping manner to frictionally engage the base of a table type circular saw. The frame provides two pieces of square tubing, an inside tube telescopically carried within an outside tube. Each tube carries a bracket which engages the side of the table saw. An all thread rod carried within both tubes carries washers and threaded nuts at each end, thereby biasing the tubes together, causing the brackets to grip the sides of the table saw. A pivot post is supported by the frame in a vertical orientation. The pivot post provides a support tube, fixed to the frame, and a pivot tube carried within the support tube to rotate about an axis perpendicular to the horizontal. The support tube carries a gauge arm, which moves through a horizontal plane when the pivot tube pivots. The gauge arm carries an annular plate in an off-center manner. After a first cut is made, the pipe is rotated approximately 180 degrees before making the second cut. The gauge arm is then pivoted to a position next to the pipe. The annular plate is then rotated about the gauge arm, coming into contact with the first cut. This rotates the pipe exactly 180 degrees. The gauge is then moved and the second cut made, finishing the saddle cut.

4 Claims, 3 Drawing Sheets

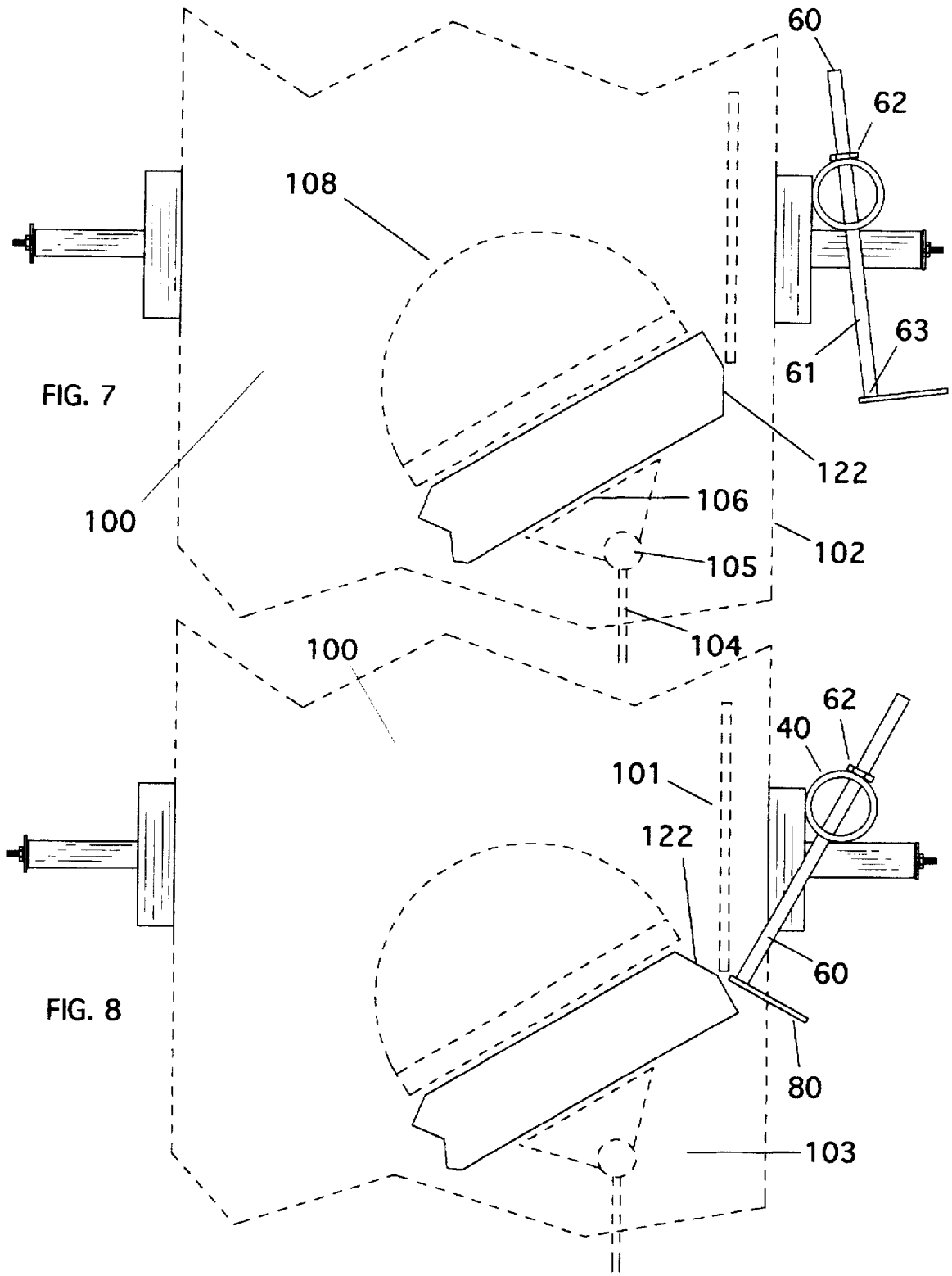

PIPE SADDLE GAUGE

CROSS-REFERENCES

There are no applications related to this application filed in this or any foreign country.

BACKGROUND

To join two pipes together it is often necessary to cut a saddle in a first pipe, so that the end of the first pipe is contoured correctly to adapt to a mid-point on the surface of the second pipe. The saddle in the end of a first pipe should be cut to a depth that reflects the radius of the second pipe. Once accomplished, the first pipe may be fastened to the second pipe by means of welding or gluing.

Unfortunately, the process of accurately cutting a saddle in the end of a pipe is a time consuming process having a number of steps that requires considerable skill. As a result, what is needed is a pipe saddle gauge that is attachable to known table saws or similar cutting devices, and that can aid the operator to quickly and accurately make a saddle cut in the end of a first pipe to fit the contour of the outside of a second pipe.

SUMMARY

The present invention is directed to an apparatus that satisfies the above needs. A novel pipe saddle gauge is provided that allows an operator to quickly and accurately make a saddle cut in a first pipe to fit the contour of the outside of a second pipe.

The pipe saddle gauge of the present invention includes:

(a) An adjustable frame provides two pieces of square tubing which are telescopically related, so that the overall length of the two pieces may be arbitrarily set by adjusting the degree of overlap between the two pieces of pipe. The frame is removably attachable to the base of a table type rotary saw of a type having a circular blade and an adjustable vise-like fence that holds a work piece in a fixed manner at an angle that is adjustable by means of an attached protractor device.

(b) A vertically oriented pivot post is supported by the frame, and provides for rotary movement of the gauge arm in the horizontal plane. The pivot post provides two nested segments of round tubing. A larger segment of tubing is fastened to the frame of the pipe saddle gauge in a vertical orientation, while a second segment of of tubing, having an outside diameter incrementally smaller than the inside diameter of the first segment of tubing, is rotatably carried by the larger segment.

(c) A gauge arm, carried by the pivot post, is rotatable in the horizontal plane. Typically, the gauge arm is rotated between two positions. In a first position, the arm is to the side, out of the way of the saw blade and not in contact with the work piece. In a second position, the gauge arm supports the annular plate in contact with the end portion of the pipe to be cut.

(d) An annular plate is carried by the gauge arm, and is used to align the pipe immediately prior to the second cut. In the preferred embodiment, the annular plate resembles a large washer. The annular plate insures that the pipe is rotated precisely 180 degrees, thereby causing the second cut to be the mirror image of the first cut.

In use, an operator may desire to cut a saddle in a first end of a first pipe to allow attachment of the end of the first pipe to a mid-point of a second pipe. The saddle cut on the first pipe accommodates the curvature of the second pipe. To make a saddle cut in first end of a first pipe, the operator mounts the pipe to be cut on the table saw, between the fence and the contact plate of the vise. The protractor device associated with the fence is adjusted, typically to 31 or 32 degrees. The pipe is extended to the point that the blade will begin the cut at the mid-point of the opening of the pipe, i.e. the very top and the very bottom of the pipe opening. The contact plate of the vise is then tightened, holding the pipe in place. The first cut is made, shearing off part of the end of the pipe.

To make the second and final cut accurately in the case of a 90 degree joint, it is necessary to cut the uncut half of the pipe as the mirror image of the cut half of the pipe. Therefore, the pipe must be rotated exactly 180 degrees. The operator first rotates the pipe approximately 180 degrees. The gauge arm is then pivoted toward the end of the pipe through the horizontal plane. The annular plate is then rotated about the gauge arm, bringing it into contact with the cut portion of the pipe. The pipe is then rotated until the cut portion is flush with the annular plate, after which the operator tightens the vise of the saw. This insures that the pipe was rotated exactly 180 degrees. The annular plate is then rotated away from the pipe by rotating it about the gauge arm. The gauge arm is then free to pivot about the pivot post in the horizontal plane until the gauge arm is clear of the saw. The second cut is then made, completing the operation.

It is therefore a primary advantage of the present invention to provide a novel pipe saddle gauge that is adaptable to almost any table saw, and that bolts onto such a saw in a quick and easy manner without requiring permanent modification of the saw.

Another advantage of the present invention is to provide a novel pipe saddle gauge that provides the advantages an extremely rapid means to confirm that a pipe to be cut has been rotated exactly 180 degrees.

A still further advantage of the present invention is to provide a pipe saddle gauge that allows an operator to saddle a pipe even without making measurements or marking the pipe, and in much less time than would otherwise be required.

DRAWINGS

These and other features, aspects, and advantages of the present invention will become better understood with regard to the following description, appended claims, and accompanying drawings where:

FIG. 7 is a top view of the pipe saddle gauge attached to a saw, shown in dotted outline, having a pipe having the first cut in the saddle process already made;

3

Figure 9:
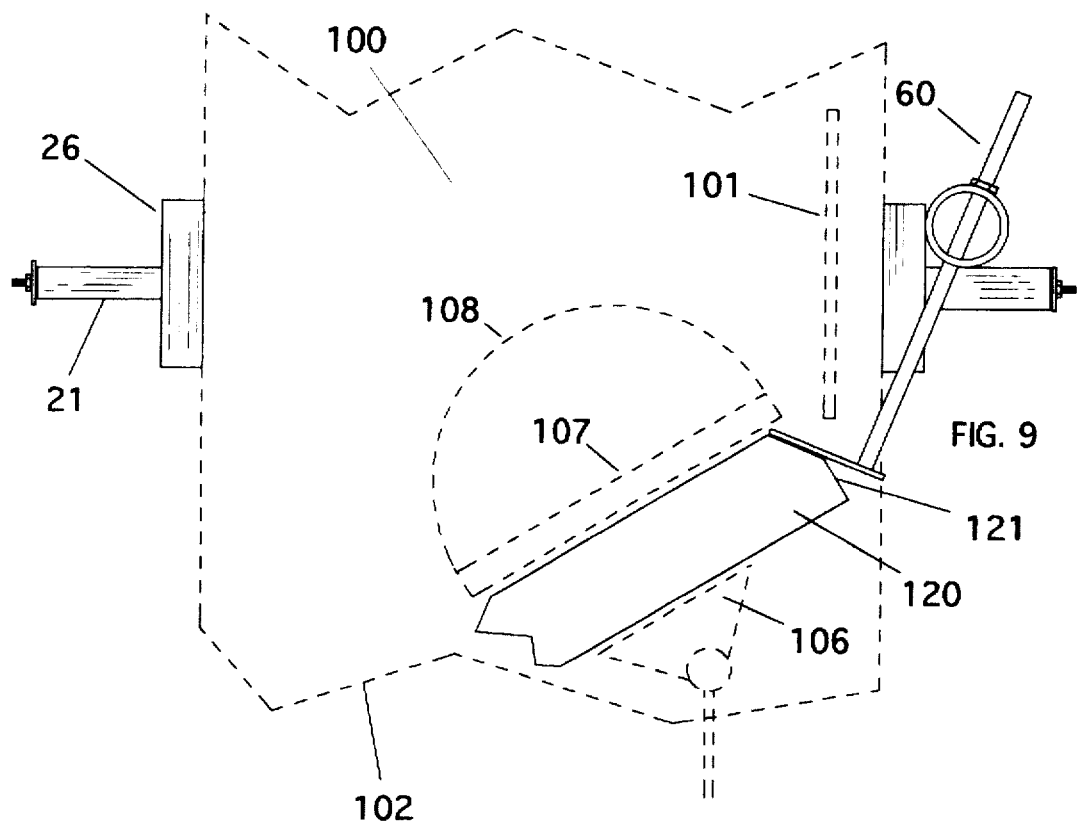
Figure 10:
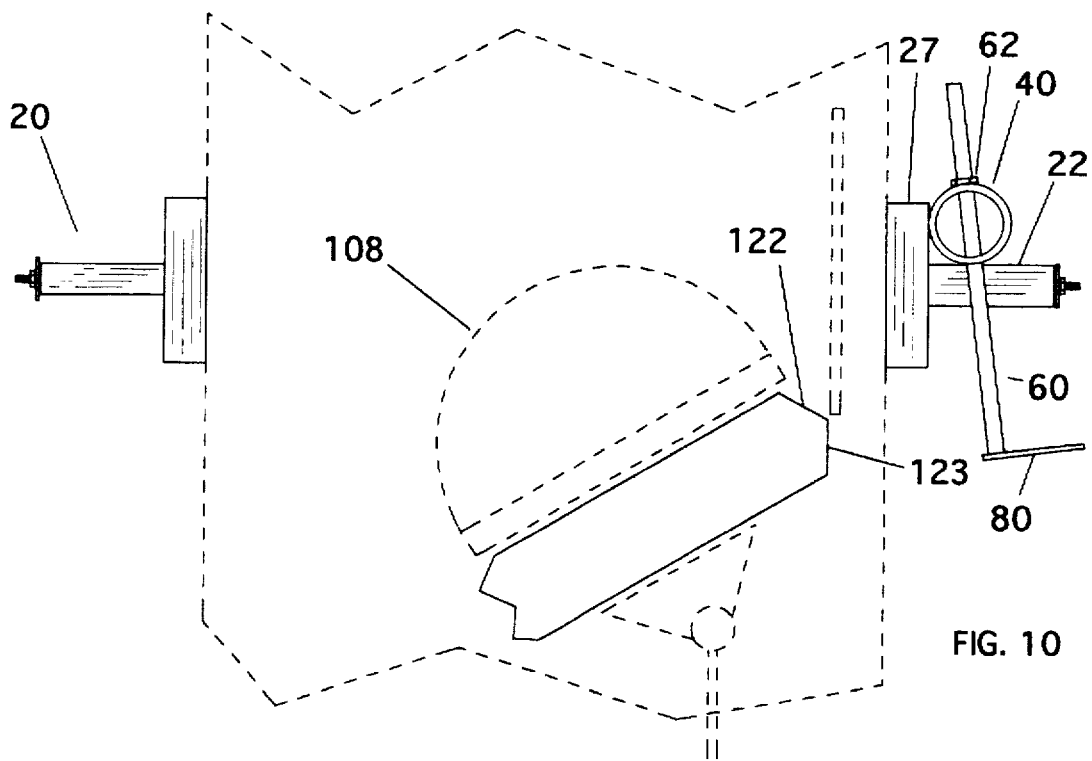

FIG. 8 is similar to the view of FIG. 7, except that the pipe has been rotated by hand approximately 180 degrees, and the gauge arm pivoted to a position near the pipe;

FIG. 9 is similar to the view of FIG. 8, except that the annular plate carried by the gauge arm has been pivoted into a position in contact with the edge created by the first cut; and FIG. 10 is a view of the pipe immediately after the second cut has been made.

DESCRIPTION

Referring to the drawings, a pipe saddle gauge constructed in accordance with the principles of the invention is seen. The pipe saddle gauge provides a frame 20 which adjusts in a telescoping manner to frictionally engage the base of a table type rotary saw 100. The frame generally provides outside and inside segments of square tubing 21, 22 which adjust in a telescoping manner. The frame supports a vertically oriented pivot post 40 in a position adjacent to the blade of the saw. The pivot post carries a horizontally oriented gauge arm 60, which may be rotated about the pivot post in the horizontal plane. The gauge arm in turn carries an annular plate 80 by means of an off-center attachment. The annular plate may be rotated about the axis of the gauge arm, as seen particularly by comparison of FIGS. 8 and 9.

Figure 1:
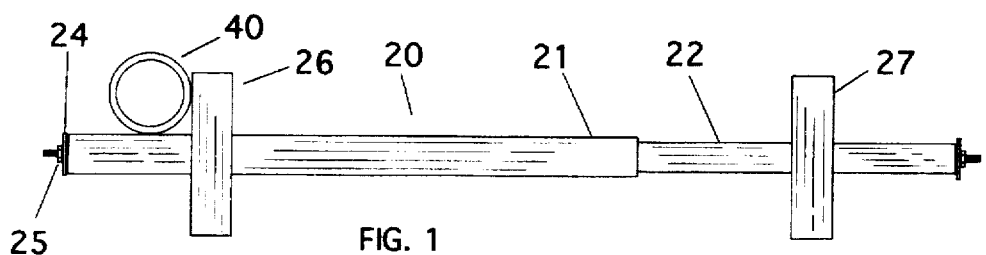
FIG. 1 is a top isometric view of a version of the frame and support tube of the invention.
Figure 2:
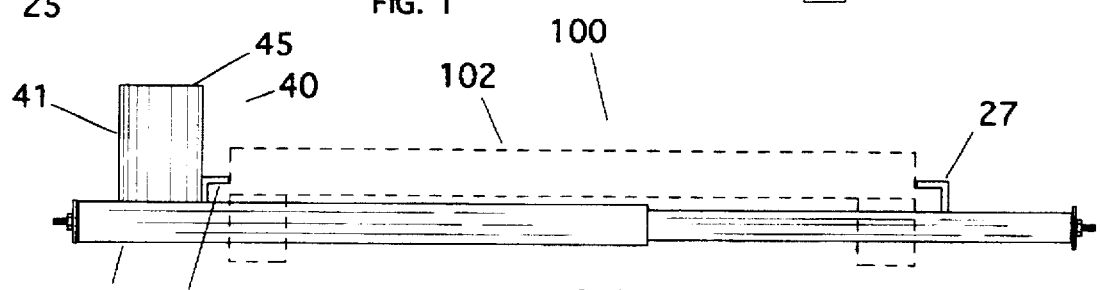
FIG. 2 is a side isometric view of the frame and support tube of FIG. 1, showing the base of a table saw in dotted outline.

Referring to FIGS. 1 and 2, the frame 20 of the invention is seen. The frame provides an outside square tube 21 having an inside cross-section that is incrementally greater than the outside cross-section of an inside square tube 22. The two tubes are adjustable in a telescopic manner, as seen by a comparison of FIGS. 1 and 2. Each tube supports either a left or right angle iron bracket 26, 27. As seen in FIG. 2, the brackets 26, 27 contact the base 102 of the saw 100. An all thread rod 23 is carried inside the joined tubes 21, 22, and carries fastening means for tightening the brackets carried by the frame against the base 102 of a table saw, which typically includes washers 24 and nuts 25. The washers should be selected to have a diameter that is greater than the opening of the end of either of the tubes 21, 22.

The pivot post 40 allows the gauge arm to be rotated between a position that is off to the side of the blade, as seen in FIGS. 7 and 10, and a position that is adjacent to the blade, as seen in FIGS. 8 and 9. The pivot post provides two nested segments of tubing. A first tube segment, the support tube 41, is typically of incrementally greater diameter and is welded to the frame 20 of the pipe saddle gauge with a vertical orientation. A second tube segment, the pivot tube 42, is typically of incrementally smaller diameter and is carried rotatably within the support tube. A collar 43 carried by the pivot tube rides on the rim 45 of the support tube. The pivot tube provides fastening means for carrying the gauge arm that allows the gauge arm to rotate about its own axis, and which allows the gauge arm to move axially. In the preferred embodiment, the fastening means provides threaded holes 44 in the pivot tube and the use of an all thread rod 61 for the gauge arm. By repeated revolution of the threaded gauge arm, axial movement in either direction is achieved. Such axial adjustment may be necessary to position the annular plate flush with the first cut 122, as seen in FIG. 9.

Figure 3:
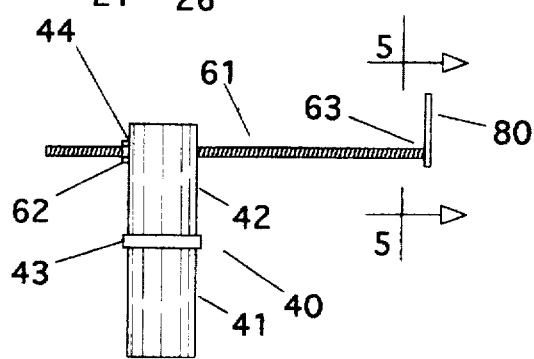
FIG. 3 is a side isometric view of a version of the pivot tube of the invention, which is rotatably carried by the support tube, and the gauge arm.
Figure 4:
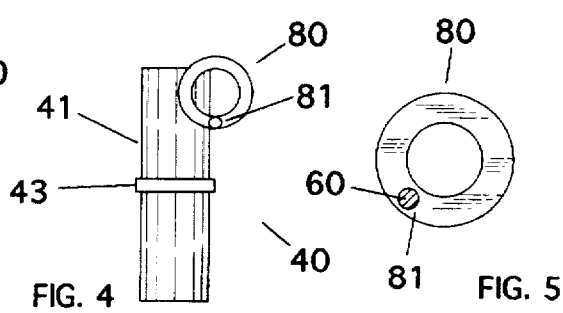
FIG. 4 is a side isometric view of the support tube and gauge arm of FIG. 3, rotated 90 degrees in the clockwise direction when viewed from above.
Figure 5:
FIG. 5 is a end isometric view of the annular plate carried by the gauge arm, as seen by the 5—5 lines in FIG. 3.
Figure 6:
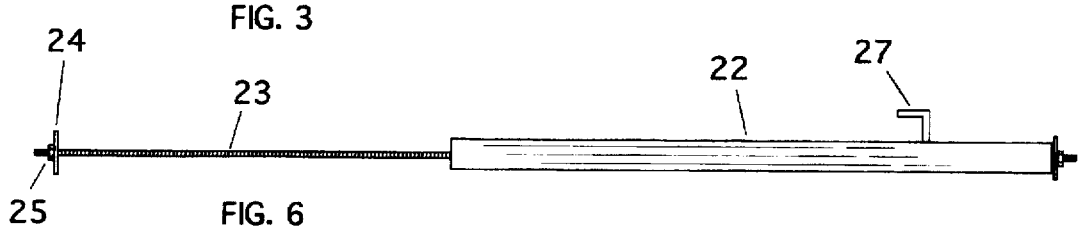
FIG. 6 is a view of the frame of FIG. 2, having the outside square tubing removed to show the inside square tubing and the all thread rod carried inside the square tubing.

A gauge arm 60 is carried by the pivot post 40, as is seen in FIGS. 2 and 3. In the preferred embodiment, the gauge arm comprises an all thread rod 61, that allows for axial movement of the gauge arm relative to the pivot post 40. An adjustment nut 62, as seen in FIG. 3, may be tightened after the gauge arm is adjusted properly in the axial direction. A forward end 63 of the gauge arm carries an annular plate 80.

4

An annular plate 80 is a washer or similar planar device. The annular plate is carried by an off-center attachment point 81. As a result of the off-center attachment point, rotation of the gauge arm about its axis rotates the annular plate between the positions seen in FIGS. 8 and 9.

By reference to the drawings and the following discussion, the use of the invention is easily understood. Referring first to FIG. 1, the frame 20 must be adjusted to fit the table saw to be used. By loosening nut(s) 25 on all thread rod 23, the user may slide the outside square tubing relative to the inside square tubing to achieve the proper length. When the brackets 26, 27 are properly positioned on the base 102 of the saw 100, the user tightens the nuts 25, thereby mounting the frame 20 in the space under the saw. The pivot tube 42 may then be inserted into the support tube 41, and the all thread rod 61 of the gauge arm 60 attached to the threaded support holes 44 of the pivot tube 42.

To make a saddle cut, the operator must make two mirror image cuts on the uncut end 121 of a pipe 120. To make the first cut, the user should set the protractor 108 of the fence 107 to an angle of about 31 or 32 degrees. The threaded drive 104 of the vise 103 is then used to hold the pipe in position. Contact plate 106 pushes the pipe against fence 107, causing pivot 105 to adjust for the angle of the fence.

As seen in FIG. 7, the actual first cut is made by blade 101 with the gauge arm 60 safely to one side. Following the cut, the operator loosens the vise 103 slightly, and rotates the cut pipe approximately 180 degrees. The gauge arm is then pivoted about the pivot post until it is in the position seen in FIG. 8. If needed, the all thread rod of the gauge arm 60 is threaded in or out, until the annular plate 80 is in approximately the same plane as the first cut 122 of the pipe 120. The annular plate 80 is then rotated about its off-center attachment point until it comes into contact with the first cut 122, as seen in FIG. 9. The pipe is then rotated slightly, until it is exactly 180 degrees from when the first cut was made, and the vise is tightened. The exact rotation required is determined by contacting the first cut 122 to the annular plate. Since the saw blade is vertical, and the annular plate is vertical, when the first cut 122 is flush with the annular plate 80 the pipe will be 180 degrees from where it was first cut.

The annular plate is then rotated again, until it is in the position seen in FIG. 8. The gauge arm is then rotated until it is in the position seen in FIG. 10. The second cut 123 is then made, completing the saddle cut.

In the event that a saddle in a first pipe is required for attachment to a second pipe wherein the angle between the two pipes is other than 90 degrees, the fence 107 will have to be readjusted between the first and second cuts. However, the annular plate of the gauge arm will still be required to insure that the pipe has been rotated exactly 180 degrees.

The previously described versions of the present invention have many advantages, including a primary advantage of the present invention to provide a novel pipe saddle gauge that is adaptable to almost any table saw, and that bolts onto such a saw in a quick and easy manner without requiring permanent modification of the saw.

Another advantage of the present invention is to provide a novel pipe saddle gauge that provides the advantages an extremely rapid means to confirm that a pipe to be cut has been rotated exactly 180 degrees.

A still further advantage of the present invention is to provide a pipe saddle gauge that allows an operator to saddle a pipe even without making complex measurements or marking the pipe, and in much less time than would otherwise be required.

Although the present invention has been described in considerable detail and with reference to certain preferred versions, other versions are possible. The structure of individual components is somewhat variable, while keeping with the strategy of the invention. For example, while in the version of the invention disclosed a threaded support 44 for the gauge arm comprising two drilled and threaded holes in the pivot tube, a simpler structure might be constructed by simply welding a nut to the upper surface of the pivot tube. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pipe saddle gauge, comprising:
    (A) an adjustable frame having a telescoping body;
    (B) a vertically oriented pivot post, carried by the frame, and pivotable about an axis perpendicular to a horizontal plane;
    (C) a gauge arm, having a forward end, the gauge arm carried by the pivot post, and having means for adjustably moving the gauge arm along its axis and having means for rotation of the forward end of the gauge arm about the pivot post; and
    (D) an annular plate, having an off-center attachment location attached to the forward end of the gauge arm.

2. The pipe saddle gauge of claim 1, wherein the adjustable frame comprises:
    (a) an outside tube;
    (b) a left bracket, carried by the outside tube;
    (c) an inside tube, slidably carried within the outside tube;
    (d) a right bracket, carried by the inside tube;
    (e) an all thread rod, carried within a channel formed by the inside and outside tubes; and
    (f) tightening means, carried by the all thread rod, for biasing the left and right brackets against the saw, thereby supporting the frame.

3. The pipe saddle gauge of claim 2, wherein the vertically oriented pivot post comprises:
    (a) a support tube, carried by the frame and oriented in the vertical direction; and
    (b) a pivot tube, carried by the support tube and pivotable about a vertical axis.

4. A pipe saddle gauge, comprising:
    (A) an adjustable frame, attachable to a saw, comprising:
        (a) an outside tube;
        (b) a left bracket, carried by the outside tube;
        (c) an inside tube, slideably carried within the outside tube in a telescoping manner;
        (d) a right bracket, carried by the inside tube;
        (e) an all thread rod, carried within a channel formed by the inside and outside tubes; and
        (f) tightening means, carried by the all thread rod, for biasing the left and right brackets against the saw, thereby supporting the frame;
    (B) a vertically oriented pivot post, comprising:
        (a) a support tube, carried by the frame and oriented in the vertical direction;
        (b) a pivot tube, carried by the support tube and pivotable about a vertical axis; and
        (c) a collar, carried by the pivot tube, sized to ride on an upper rim of the support tube;
    (C) a gauge arm, having a forward end;
    (D) fastening means, carried by the pivot post, for attaching the gauge arm to the pivot post while allowing movement of the gauge arm in its axial direction and for rotation of the forward end of the gauge arm about the pivot post; and
    (E) an annular plate, having an off-center attachment location, attached to the forward end of the gauge arm at the off-center attachment location.

* * * * *